United States Patent
Connolly

(10) Patent No.: US 10,161,727 B2
(45) Date of Patent: *Dec. 25, 2018

(54) HIGH STRAIGHTNESS ARROW AND METHOD OF MANUFACTURE

(71) Applicant: Aldila Golf Corp., Poway, CA (US)

(72) Inventor: Martin Connolly, San Marcos, CA (US)

(73) Assignee: Aldila Golf Corporation, Carlsbad, CA (US)

( * ) Notice: Subject to any disclaimer, the term of this patent is extended or adjusted under 35 U.S.C. 154(b) by 784 days.

This patent is subject to a terminal disclaimer.

(21) Appl. No.: 14/605,939

(22) Filed: Jan. 26, 2015

(65) Prior Publication Data

US 2016/0161227 A1    Jun. 9, 2016

Related U.S. Application Data

(62) Division of application No. 13/298,287, filed on Nov. 16, 2011, now Pat. No. 8,939,753.

(Continued)

(51) Int. Cl.
*F42B 6/04* (2006.01)
*B29C 70/56* (2006.01)
(Continued)

(52) U.S. Cl.
CPC ............ *F42B 6/04* (2013.01); *B29C 70/56* (2013.01); *F41B 5/148* (2013.01); *F42B 35/02* (2013.01);
(Continued)

(58) Field of Classification Search
CPC ....... B29C 70/56; B29C 57/00; B29C 57/005; B29C 57/12; B29C 57/02; B29C 53/56;
(Continued)

(56) References Cited

U.S. PATENT DOCUMENTS 2,723,426 A    11/1955  Pelley
2,997,739 A *   8/1961  Smith ................. B29C 33/36
                                              264/347

(Continued)

FOREIGN PATENT DOCUMENTS

JP            60212310 A      10/1985

*Primary Examiner* — Seyed Masoud Malekzadeh
(74) *Attorney, Agent, or Firm* — Joseph Sherinsky

(57) ABSTRACT

The high straightness arrow in the present invention is designed to improve the straightness of the archery arrow by adopting new manufacturing technique and method. Chamber and post are made of dissimilar metals and the chamber includes a wall that creates an external housing and defines an internal airspace. Once the post with shaft is positioned through chamber, nuts are tightened securely, forming an assembly, to straighten post. Due to the different coefficients of thermal expansion of chamber and post, when they are heated simultaneously, the chamber expands more than the post, creating a natural tension along post which results in a near perfectly straight shaft. As the assembly cools, the post and chamber return to their original length, yet the shaft retains its straightened form and thus this manufacturing process yields an arrow shaft that is straighter than shafts made of the same materials but with a traditional manufacturing technique.

12 Claims, 3 Drawing Sheets

Related U.S. Application Data

(60) Provisional application No. 61/413,983, filed on Nov. 16, 2010.

(51) Int. Cl.

| | | |
|---|---|---|
| *F42B 35/02* | (2006.01) | |
| *F41B 5/14* | (2006.01) | |
| *B29C 53/82* | (2006.01) | |
| *F42B 6/02* | (2006.01) | |
| *F42B 6/06* | (2006.01) | |
| *B29C 33/48* | (2006.01) | |
| *B29C 65/00* | (2006.01) | |
| *B29L 23/00* | (2006.01) | |
| *B29C 70/06* | (2006.01) | |
| *B29C 57/02* | (2006.01) | |
| *B29C 70/44* | (2006.01) | |
| *B29C 35/02* | (2006.01) | |
| *B29C 53/56* | (2006.01) | |
| *B29C 33/50* | (2006.01) | |
| *B29C 70/42* | (2006.01) | |
| *B29C 70/34* | (2006.01) | |
| *F42B 6/08* | (2006.01) | |
| *B29C 57/00* | (2006.01) | |
| *B29C 57/12* | (2006.01) | |
| *B29L 31/52* | (2006.01) | |

(52) U.S. Cl.
CPC .......... *B29C 33/485* (2013.01); *B29C 33/505* (2013.01); *B29C 35/0227* (2013.01); *B29C 35/0238* (2013.01); *B29C 53/56* (2013.01); *B29C 53/566* (2013.01); *B29C 53/824* (2013.01); *B29C 57/00* (2013.01); *B29C 57/005* (2013.01); *B29C 57/02* (2013.01); *B29C 57/12* (2013.01); *B29C 66/00* (2013.01); *B29C 70/06* (2013.01); *B29C 70/34* (2013.01); *B29C 70/342* (2013.01); *B29C 70/42* (2013.01); *B29C 70/44* (2013.01); *B29C 70/446* (2013.01); *B29L 2023/22* (2013.01); *B29L 2031/52* (2013.01); *F42B 6/02* (2013.01); *F42B 6/06* (2013.01); *F42B 6/08* (2013.01)

(58) Field of Classification Search
CPC ..... B29C 53/566; B29C 53/824; B29C 43/52; B29C 70/42; B29C 70/44; B29C 70/446; B29C 70/34; B29C 70/342; B29C 70/06; B29C 33/485; B29C 33/505; B29C 35/0227; B29C 35/0238; B29C 66/00; F42B 6/02; F42B 6/04; F42B 6/06; F42B 6/08; F41B 5/148; B29L 2023/22; B30B 15/062; B30B 15/064
USPC ................................................. 425/392, 393
See application file for complete search history.

(56) References Cited

U.S. PATENT DOCUMENTS

| | | | |
|---|---|---|---|
| 2,999,272 A | 9/1961 | Warnken | |
| 3,194,705 A | 7/1965 | Caplan | |
| 3,226,464 A | 12/1965 | Saumsiegle et al. | |
| 3,237,243 A | 3/1966 | Saumsiegle et al. | |
| 3,879,160 A | 4/1975 | Miller | |
| 3,914,101 A | 10/1975 | Stefanka | |
| 3,999,912 A * | 12/1976 | Hall | B29C 53/56 425/389 |
| 4,350,485 A | 9/1982 | Larribe | |
| 4,808,362 A | 2/1989 | Freeman | |
| 4,876,050 A * | 10/1989 | Horton | B29C 35/0222 264/102 |
| 5,087,394 A | 2/1992 | Keith | |
| 5,132,073 A | 7/1992 | Nielson | |
| 5,338,177 A | 8/1994 | Le Touche | |
| 5,350,139 A | 9/1994 | Leyderman | |
| 5,601,892 A * | 2/1997 | McIntosh | B29C 70/08 428/35.8 |
| 5,688,539 A | 11/1997 | Tsai et al. | |
| 5,780,071 A | 7/1998 | Racioppi et al. | |
| 5,783,227 A | 7/1998 | Dunham | |
| 5,814,268 A * | 9/1998 | Banchelin | A63B 53/10 156/156 |
| 5,911,452 A | 6/1999 | Yan | |
| 6,071,460 A * | 6/2000 | Renaudin | B29C 70/446 264/257 |
| 6,190,590 B1 | 2/2001 | Randall et al. | |
| 6,299,810 B1 * | 10/2001 | Blackinton, Jr. | B29C 53/66 264/102 |
| 6,554,725 B1 * | 4/2003 | Schaar | F42B 6/04 473/578 |
| 6,554,726 B2 * | 4/2003 | Thurber | F42B 6/04 473/578 |
| 7,052,567 B1 * | 5/2006 | Blackmore | B29C 35/0272 138/98 |
| 7,112,054 B2 * | 9/2006 | Frantz | B29C 35/0233 156/156 |
| 7,223,089 B2 | 5/2007 | Schmuhl et al. | |
| 7,314,364 B2 | 1/2008 | Mahoney et al. | |
| 7,335,012 B2 | 2/2008 | Blanton et al. | |
| 7,381,048 B2 | 6/2008 | Brown et al. | |
| 7,771,186 B2 | 8/2010 | Sakata et al. | |
| 7,824,171 B2 * | 11/2010 | Hanson | B29C 33/505 264/257 |
| 8,002,926 B2 * | 8/2011 | Graham | B29C 33/04 156/169 |
| 8,215,945 B2 | 7/2012 | Matsumoto et al. | |
| 8,393,887 B2 | 3/2013 | Brown et al. | |
| 8,394,310 B2 | 3/2013 | Hanson et al. | |
| 8,454,340 B1 * | 6/2013 | Loveless | B29C 71/02 219/535 |
| 2003/0127774 A1 | 7/2003 | Stephenson et al. | |
| 2004/0164555 A1 | 8/2004 | Warburton-Pitt et al. | |
| 2004/0224047 A1 | 11/2004 | Chobotov et al. | |
| 2005/0186302 A1 | 1/2005 | Sohn et al. | |
| 2005/0123640 A1 | 6/2005 | Mahoney et al. | |
| 2006/0155371 A1 | 7/2006 | Henderson | |
| 2006/0281593 A1 * | 12/2006 | Young | A01K 87/00 473/578 |
| 2007/0096368 A1 * | 5/2007 | Hanson | B29C 33/505 264/314 |
| 2007/0199360 A1 | 8/2007 | Sarac et al. | |
| 2009/0215550 A1 | 8/2009 | You et al. | |
| 2009/0291785 A1 * | 11/2009 | Smith | F42B 6/04 473/578 |

* cited by examiner

HIGH STRAIGHTNESS ARROW AND METHOD OF MANUFACTURE

CROSS REFERENCE TO RELATED APPLICATION

This application is a divisional of, and claims the benefit of priority to, U.S. Utility patent application Ser. No. 13/298,287 filed Nov. 16, 2011, now issued as U.S. Pat. No. 8,939,753, entitled "High Straightness Arrow and Method of Manufacture," which claims priority to and the benefit of U.S. Provisional Patent Application Ser. No. 61/413,983, filed on Nov. 16, 2010, entitled "High Straightness Arrow and Method of Manufacture."

BACKGROUND OF THE INVENTION

Field of the Invention

The present invention relates generally to archery arrows, and more specifically to techniques for improving the straightness of the arrow and method of manufacture for the high straightness arrow. The present invention is more particularly, though not exclusively, useful as a manufacturing technique which provides for more consistent straightness to the arrows.

Description of the Related Art

In the archery industry, there is a consistent drive towards manufacturing arrows having improved straightness. Specifically, an arrow's flight path is determined in large part by the flexibility and straightness of the arrow shaft. While some natural oscillations are expected in a carbon fiber shaft, the overall, steady state straightness is highly coveted by archers as it improves the accuracy of the arrow shot.

In light of this consistent pursuit of arrow straightness, a high straightness arrow and method of manufacture have been developed. The high straightness arrow is manufactured from carbon fiber materials generally known and used in the archery industry. Arrows manufactured using the technique of the present invention are consistently more straight than arrows made using the same materials but with a traditional manufacturing technique.

SUMMARY OF THE INVENTION

The high straightness arrow in the present invention is designed to improve the straightness of the archery arrow by adopting new manufacturing technique and method of using carbon fiber materials.

In a preferred embodiment, chamber and post are made of dissimilar metals and the chamber includes a wall that creates an external housing and defines an internal airspace. The post wrapped with a carbon fiber shaft may be inserted into the chamber and post may be threaded on its ends that extend outside chamber. Once post with shaft is positioned through chamber, nuts are tightened securely, forming an assembly, to straighten post. Due to the greater coefficient of thermal expansion of chamber than that of post, when they are heated simultaneously, the chamber length expands more than the length of the post.

At the end of the heating cycle, a difference in length of chamber and post creates a natural tension along post which results in a near perfectly straight shaft. As the assembly cools, the post and chamber return to their original length, yet the shaft retains its straightened form and thus this manufacturing process yields an arrow shaft that is straighter than shafts made of the same materials but with a traditional manufacturing technique.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein.

DETAILED DESCRIPTION OF THE INVENTION

Figures 1, 2:
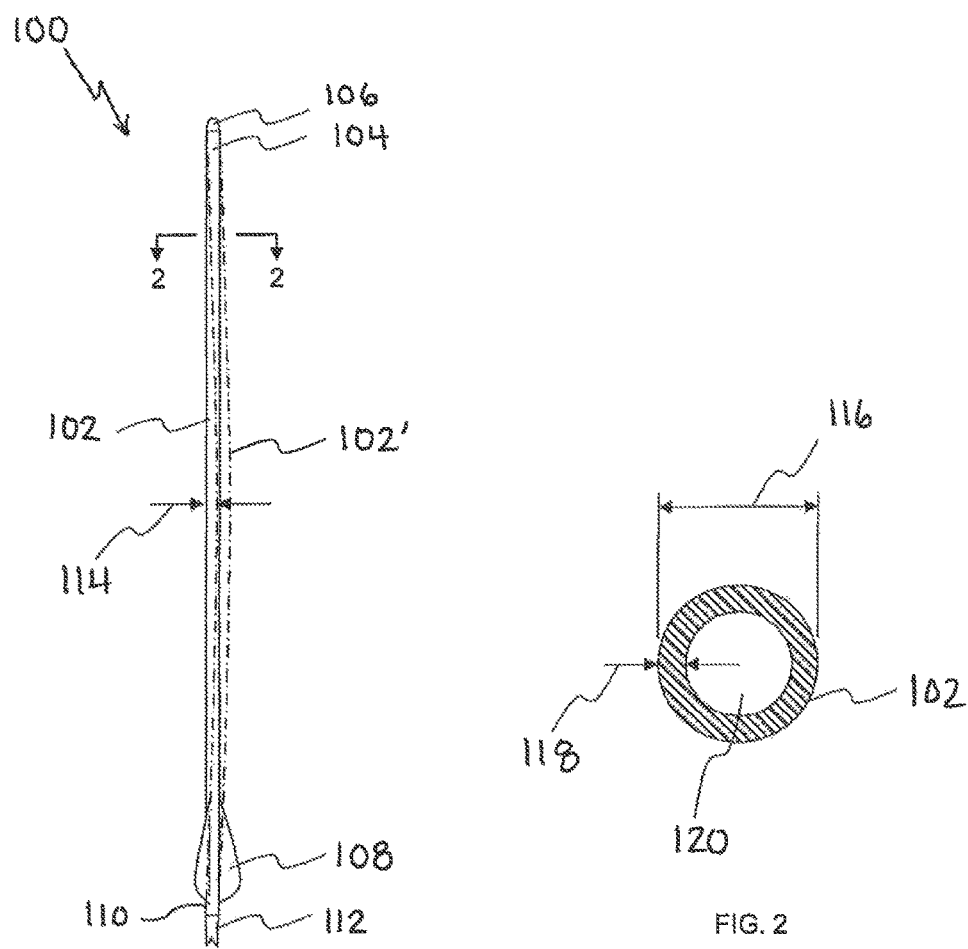
FIG. 1 is a diagrammatic view of an arrow in the present invention, with an illustration of lateral flexure when it is shot.
FIG. 2 is a cross-sectional view taken along lines 2-2 of FIG. 1.

Referring to FIG. 1, an arrow is shown and generally designated 100. Arrow 100 includes a shaft 102 with a tip end 104 having equipped with a point 106, and fletching 108 adjacent nock end 110 equipped with a nock 112. Arrow 100 often is manufactured with an inherent, yet unwanted, curvature shown by dashed lines 102'. This curvature creates a flight path that is not as straight as a perfectly straight arrow as the curvature results in a flight that is not axial to the arrow shaft 102. Specifically, the arrow shaft 102 bends along its length so as to deflect a distance 114. As a result of the non-linear flight, the target is often missed.

FIG. 2 is a cross-sectional view of the arrow 100 as taken along lines 2-2 of FIG. 1 which illustrates a shaft 102 having a diameter 116, a wall thickness 118, and defines an internal bore 120. These dimensions can vary depending on the type of arrow being manufactured, and can be increased or decreased depending on the materials used in the shaft, as well as the style of arrow being manufactured.

Figure 3:
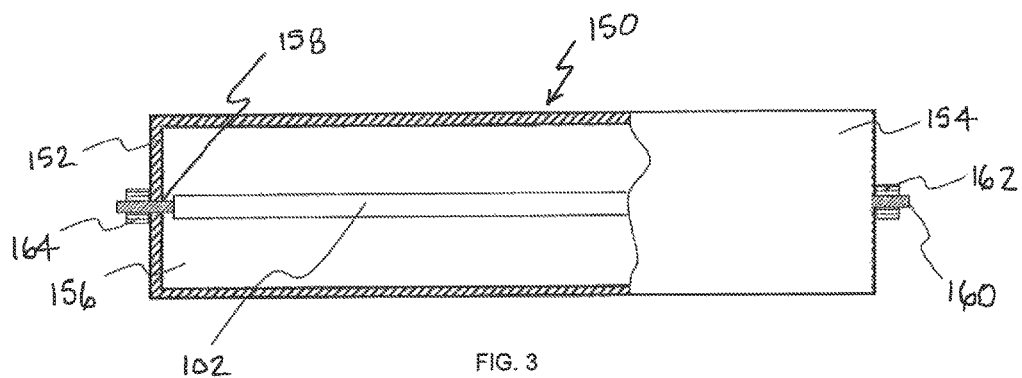
FIG. 3 is a diagrammatic view of an arrow equipped within a chamber used to manufacture the high straightness arrow and method of manufacture in the present invention.

The chamber used to manufacture the high straightness arrow and method of manufacture is shown in FIG. 3 with a portion cut away for clarity, and generally designated 150. Chamber 150 includes a wall 152 that creates an external housing 154 and defines an internal airspace 156. Wall 152 is formed with a pair of holes 158 through which a post 160 can be inserted such that post 160 passes longitudinally through the internal chamber 156. It is appreciated that chamber 150 may be made such that the post 160 wrapped with a carbon fiber shaft 102 may be inserted. For instance, chamber 150 may have multiple pieces, a removable cover, or the holes 158 are sized to pass post 162 with shaft 102 through the length of the chamber 150. Post 160 may be threaded on its ends that extend outside chamber 150. Once post 160 with shaft 102 is positioned through chamber 150, nuts 162 and 164 are tightened securely to straighten post 160.

In a preferred embodiment, chamber 150 and post 160 are made of dissimilar metals. Specifically, the coefficient of thermal expansion of chamber 150 is greater than that of post 160 such that when they are heated simultaneously, the chamber 150 length expands more than the length of the post 160.

Figure 4:
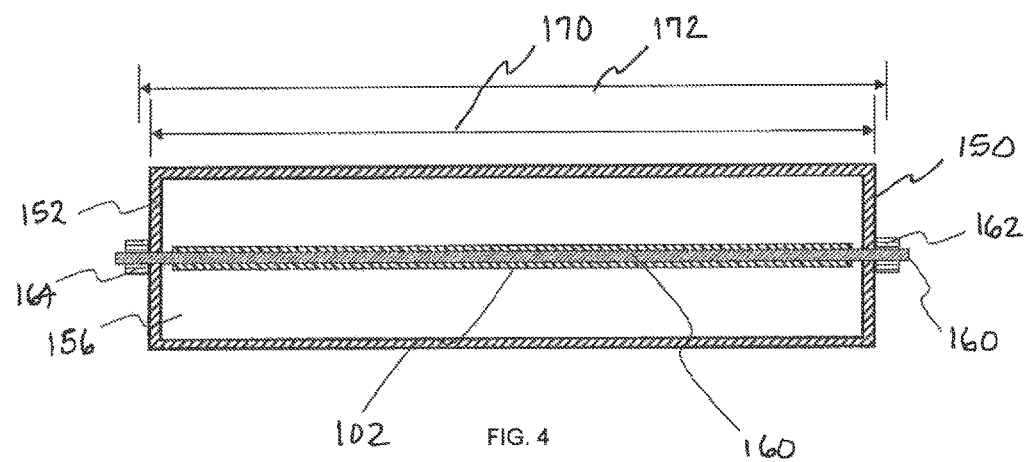
FIG. 4 is a diagrammatic view of a chamber loaded with post, shaft and nuts illustrating the expansion of the chamber when heated.

As shown in FIG. 4, chamber 150 is loaded with post 160 and shaft 102, and nuts 162 and 164 are securely tightened in place to form an assembly. In this configuration, chamber 150 has a length 170 at the starting temperature. Once tightened, the entire assembly is placed into an oven or other heat source. This heat source heats the assembly such that shaft 102 is exposed to a uniform heat. In a preferred embodiment, chamber 150 may be tubular so that the distance from the longitudinal walls of the device are the same along the length of the arrow shaft 102. Once heated the chamber expands to a length 172 that is greater than the length of the post 160 expansion length.

Figure 5:
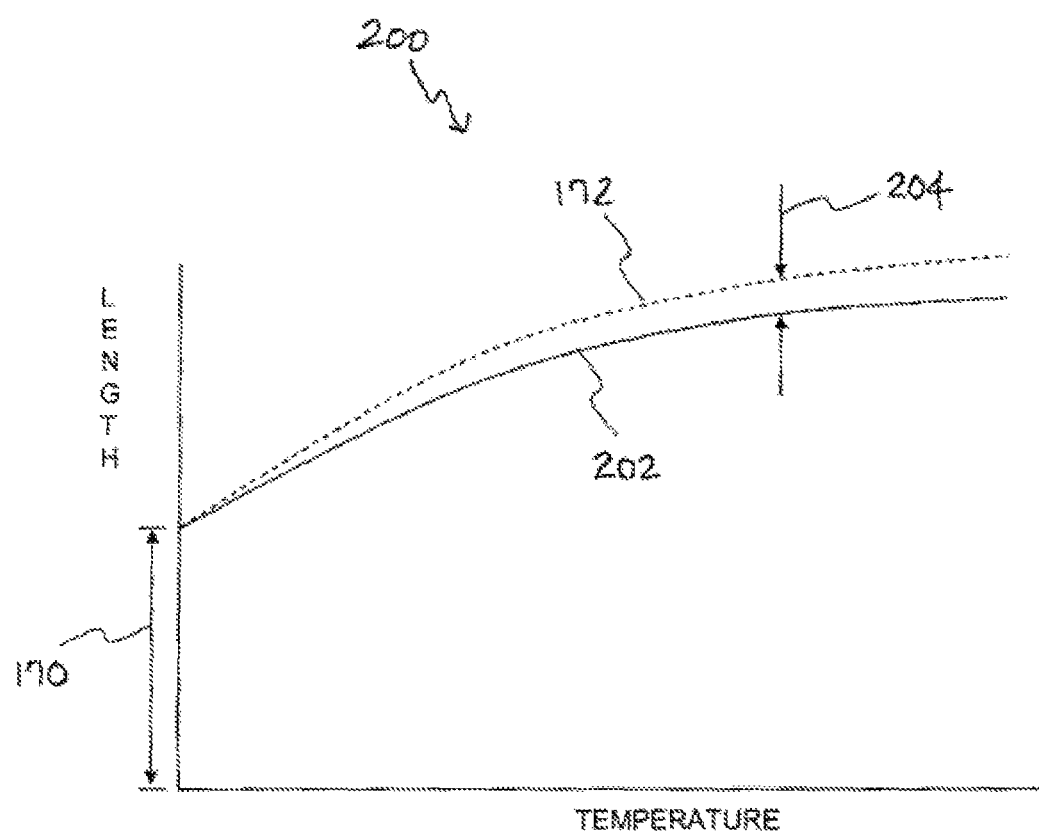
FIG. 5 is a graphical representation of the correspondingly expanded lengths of the chamber and post in the present invention.

Referring to FIG. 5, a graphical representation 200 of the correspondingly expanded lengths of the chamber 150 and post 160 are shown. Specifically, graph 200 includes a representative graph of the expanded length pf the chamber as a function of temperature. Chamber 150 begins with original length 170 and as the temperature rises, the length of the chamber increases as dashed line shows to length 172. The length of the post 160, however, begins at length 170, yet expands at a lesser rate as shown by solid line 202. At the end of the heating cycle, there is a difference in length 204 that creates a natural tension along post 160 which results in a near perfectly straight shaft 102.

As the assembly cools, the post and chamber return to their original length, yet the shaft retains its straightened form and thus this manufacturing process yields an arrow shaft that is straighter than shafts made with different techniques.

While there have been shown what are presently considered to be preferred embodiments of the present invention, it will be apparent to those skilled in the art that various changes and modifications can be made herein without departing from the scope and spirit of the invention.

What is claimed is:

1. A process for manufacturing a high straightness arrow shaft comprising the steps of:
    applying a composite fiber material to a post;
    installing said post and said composite fiber material within a chamber,
        wherein said chamber comprises a wall forming an external housing and a chamber length, said chamber further comprising a metal having a first coefficient of thermal expansion, said chamber length increases as temperature rises and decreases as temperature lowers,
        wherein said post comprises a metal having a second coefficient of thermal expansion smaller than said first coefficient of thermal expansion and a post length, said post length increases as temperature rises and decreases as temperature lowers at a slower rate than said chamber length;
    heating said chamber, said post, and said composite fiber material evenly and simultaneously,
        wherein heating said post and said chamber allows said post to expand according to said second coefficient of thermal expansion and allows said chamber to expand according to said first coefficient of thermal expansion, such that said chamber length expands more than said post length when heat is applied, thereby creating tension in said post;
    curing said composite fiber material on said post, said composite fiber material becoming a high straightness arrow shaft;
    cooling said chamber, said post, and said high straightness arrow shaft, such that said chamber and said post return to an original length; and
    removing said high straightness arrow shaft from said post.

2. The process of claim 1, wherein an expansion of said post according to said second coefficient of thermal expansion results in an internal diameter of said high straightness arrow shaft greater than an external diameter of said post after cooling.

3. The process of claim 1, wherein said post further comprises a first end and a second end.

4. The process of claim 3, wherein said first end and said second end of said post are externally threaded to accept a nut.

5. The process of claim 1, wherein said chamber further comprises a first wall having at least one first hole and a second wall having at least one second hole, disposed on opposite ends of said chamber, and wherein said first end of said post is secured to said first hole, and said second end of said post is secured to said second hole.

6. The process of claim 1, wherein said chamber is tubular in shape, allowing uniform heating of both said chamber and said post simultaneously.

7. The process of claim 1, wherein said step of installing said post and said composite fiber material within a chamber comprises the steps of securing a first end of said post to a first hole and a second end of said post is to a second hole.

8. The process of claim 7, wherein said step of installing said post and said composite fiber material within the chamber is by a quick release.

9. The process of claim 1, wherein said step of applying said composite fiber material to said post further comprises the step wherein said carbon fiber material is woven in a mesh around the circumference and down the length of said post, such that there is no seam in said carbon fiber.

10. The process of claim 9, wherein said step of applying a composite fiber material to the post further comprises the step of applying an adhesive to bind said carbon fiber to said exterior of said post.

11. The process of claim 10, wherein the step of removing said high straightness arrow shaft from said post comprises the step of applying a releasing agent to break down said adhesive, allowing easy removal of said high straightness arrow shaft from said mandrel.

12. The process of claim 1 further comprising the step of polishing said high straightness arrow shaft removed from said post to remove imperfections.

\* \* \* \* \*